Sept. 28, 1954          J. A. KUHN, SR                    2,690,482
                         CHRONOMETER
Filed Oct. 4, 1950                                  3 Sheets-Sheet 1

INVENTOR.
Joseph A. Kuhn, Sr.
BY
Thomas W. J. Clark
Attorney

Sept. 28, 1954   J. A. KUHN, SR   2,690,482
CHRONOMETER
Filed Oct. 4, 1950   3 Sheets-Sheet 2

INVENTOR.
Joseph A. Kuhn, Sr.
BY
Attorney

Sept. 28, 1954  J. A. KUHN, SR  2,690,482
CHRONOMETER

Filed Oct. 4, 1950  3 Sheets-Sheet 3

INVENTOR.
Joseph A. Kuhn, Sr.
BY
Thomas W. J. Clark
Attorney

Patented Sept. 28, 1954

2,690,482

UNITED STATES PATENT OFFICE 2,690,482

CHRONOMETER

Joseph A. Kuhn, Sr., Baltimore, Md.

Application October 4, 1950, Serial No. 188,350

6 Claims. (Cl. 200—38)

This invention relates to a timing device and more particularly to a multiple break circuit for a sidereal chronometer.

Sidereal chronometers are used in astronomical field observations for carrying the local sidereal time as computed from radio signals received at a given instant to the actual time of observation when appropriate radio signals may not be available. It is often desirable to record astronomical observations and the sidereal time on a chronograph or the like to form a permanent record. A method of recording sidereal time is to provide means in the chronometer for breaking a circuit therethrough at specified intervals.

Inasmuch as different intervals between breaks are frequently quite desirable, it is an object of this invention to provide a multiple break-circuit chronometer wherein different periods between breaks may be conveniently selected.

It is a further object of the invention to provide apparatus which may be conveniently and simply applied to existing chronometers and is suitably rugged and dependable and does not interfere with the required accuracy of the chronometer.

Further objects of the invention will be apparent from the following description and the accompanying drawings forming a part hereof and in which.

In the drawings similar numerals refer to similar parts throughout the several views.

Figure 2:
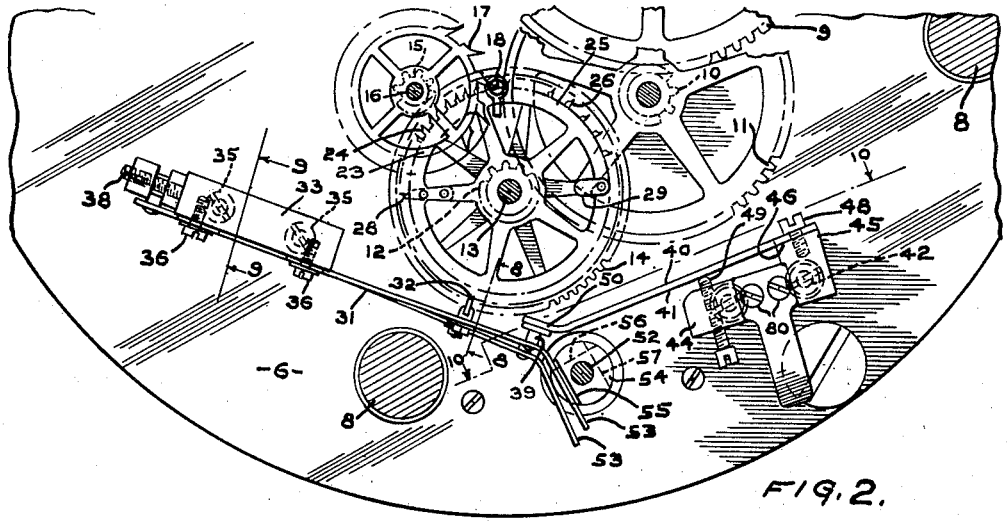
Figure 2 is a partial sectional view taken along the line 2—2 of Figure 1.
Figure 1:
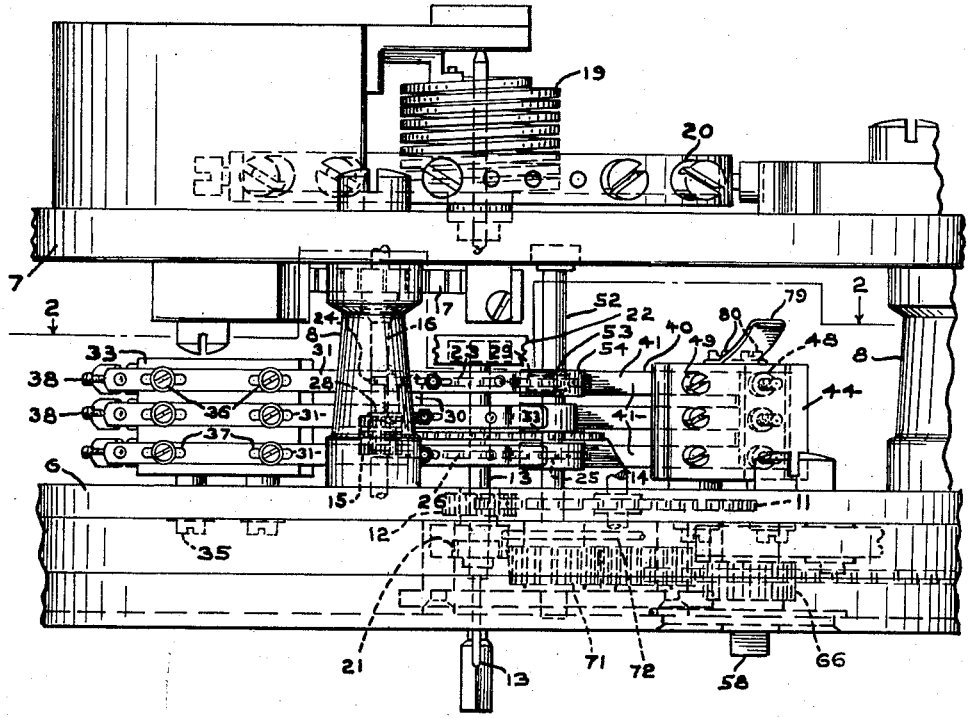
Figure 1 is a partial side elevational view of the works of a chronometer modified according to this invention, the works having the face down.

The multiple period break circuit apparatus is illustrated in a standard sidereal chronometer comprising a casing 1 and glass cover 2 held in a rim 3 screwing on threads 4 of the casing. Spaced behind the dial 5 are top or front plate 6 and rear or bottom plate 7 supported in spaced relation by posts 8.

The main spring drives gears 9, 10, 11 and 12 forming part of the works, to rotate the second hand shaft 13 one revolution each minute. Gear 14 on shaft 13 drives pinion 15 on escapement wheel shaft 16. The escapement wheel 17, detent 18, balance spring 19 and balance wheel 20 control the rotation of shaft 16 in the usual manner and thus control the rotation of the second hand shaft 13. The second hand shaft is mounted in bearings 21 and 22.

Figure 6:
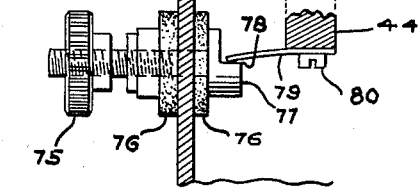
Figure 6 is a partial vertical sectional view of the upper one second gear and the one minute tooth.
Figure 7:
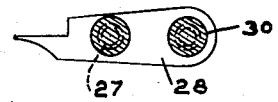
Figure 7 is a horizontal sectional view along the line 7—7 of Figure 6.

On the second hand shaft 13 are mounted the multiple actuators for operating the break circuit mechanisms, there being three in the present embodiment. These actuators comprise a one-second period break wheel 23 which has sixty teeth 24, inasmuch as the shaft rotates one revolution per minute. A two-second wheel 25 has thirty teeth 26. Intermediate the two wheels and carried by pins 27 attached to wheel 23 is a single tooth 28, shown in Figures 6 and 7. The weight of this addition on wheel 23 is suitably compensated by counterbalance 29. The tooth 28 is spaced from teeth 24 by means of sleeves 30 on pins 27.

Figure 9:
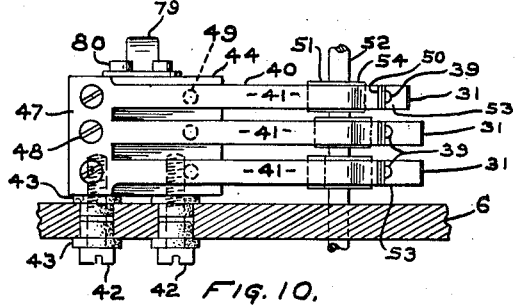
Figure 9 is a vertical sectional view along the line 9—9 of Figure 2.
Figure 9:
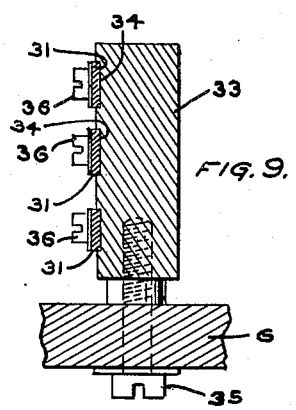
Figure 8:
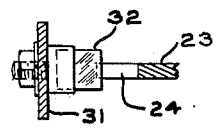
Figure 8 is a partial vertical sectional view along the line 8—8 of Figure 2.

Mounted substantially tangential to the path of each set of teeth is a responsive member comprising a spring arm 31 having a sapphire 32 mounted in a clamp bolted to arm 31, which is adapted to engage the teeth as shown in Figure 8. The spring arms are mounted on a solid bar 33, Figure 9, having parallel horizontal recesses or channels 34 therein. Bolts 35 mount the bar 33 at the proper distance from top plate 6 and screws 36 pass through slots 37 in the arms 31 to fix the arms at the desired position in channels 34. Set screws 38 fixed against longitudinal movement in bar 33, and having thereon a channeled nut with a follower on the spring arms, riding therein, serve to position the spring arms lengthwise of the recesses, when the screws 36 are loosened.

Figure 10:
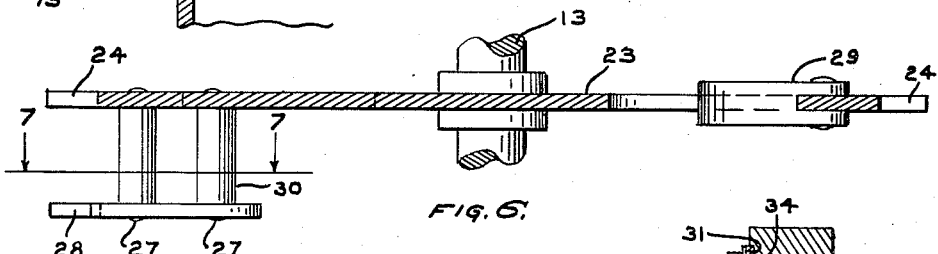
Figure 10 is a vertical sectional view along the line 10—10 of Figure 2.

Adjacent the free ends of the spring arms 31 are contact buttons 39 adapted to make and break circuit with a comb 40 having elongated strip contact members 41. The comb 40 is mounted similarly to block 44 but bolts 42 holding the block 44 are insulated from the top plate 6 by means of shouldered insulating washers 43, Figure 10. The mounting block 44 for the comb has an outwardly projecting head 45 having an outer surface 46 inclined toward the main portion of the block. The comb base 47 is fastened against this surface by means of screws 48. Individual adjusting screws 49 extend through the block 44 at the end opposite the head 45 and adjust the position of the free button contacting ends 50 of each of the comb members.

A multiple layer cam 51 is mounted on a vertical shaft 52 and engages the free ends 53 of the spring arms 31, which are bent forward as shown in Figure 2. As shown in Figure 2 the upper cam layer 54 is in such position as to present a flat cut-out 55 to upper spring end 53. In this position the spring contact button 39 rests against contacting end 50 of the upper comb member 41. The other two spring arms are held out of contact by the lower layers of cam 51. In this position of the upper spring arm, the sapphire 32 on the arm 31 engages the teeth 24 of the one-second wheel 23. The other sapphires are out of contact with teeth 26 of wheel 25 and tooth 28.

Each time a tooth 24 engages the sapphire, the upper arm 31 is sprung away and button 39 breaks contact with the upper comb end 50. The circuit is thus opened once every second.

The multiple cam has a similar flat cut-out 56 on the lowermost layer of cam 51, ninety degrees from the upper cut-out 55. Thus by rotating the shaft 52 ninety degrees the lower sapphire engages teeth 26 and the upper sapphire is moved out of engagement with teeth 24. A further ninety degree turn brings cut-out 57 into register with the middle spring arm and the middle sapphire is shifted into the path of tooth 28 and the middle contact button makes the circuit with the middle comb member. In the fourth ninety degree position of the cam shaft 52, all the spring arms 31 are held away from the comb.

Figure 4:
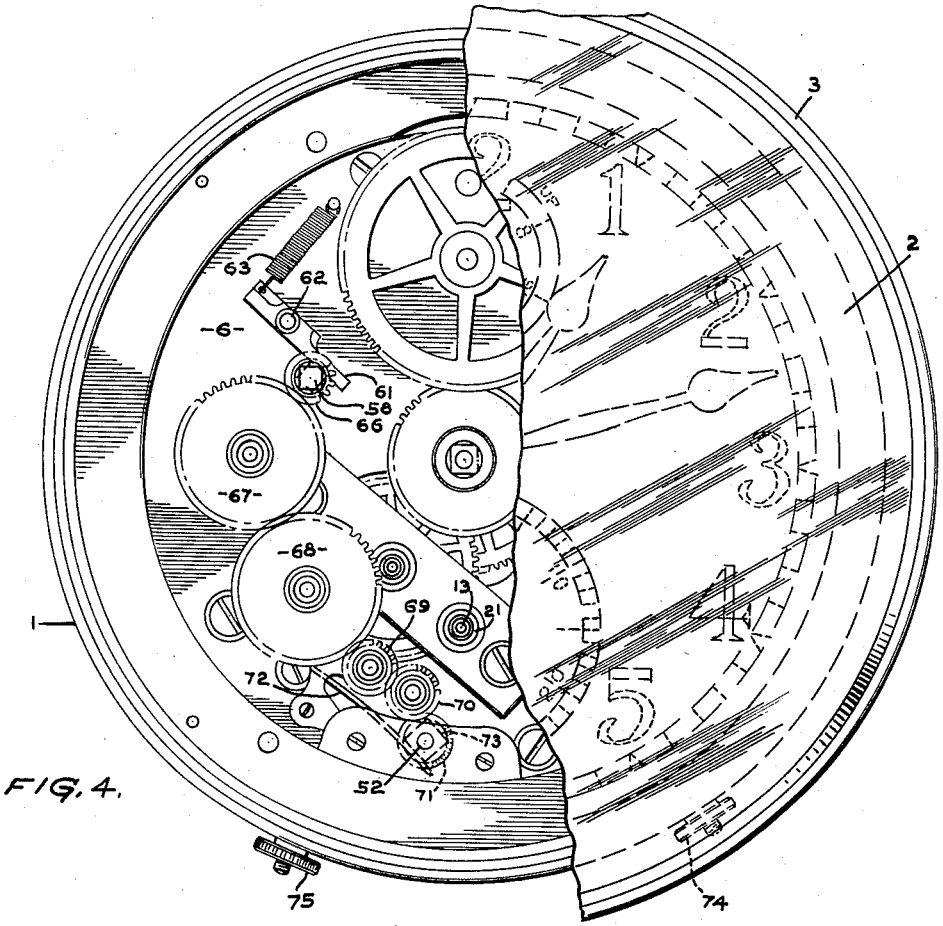
Figure 4 is a top plan view of the chronometer with the glass and dial partly broken away.
Figure 3:
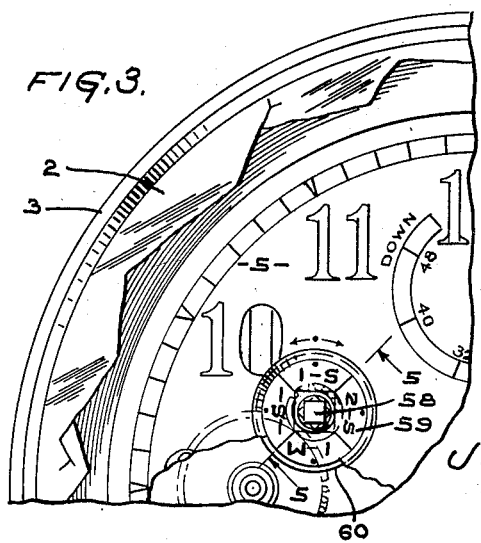
Figure 3 is a partial top plan view of the chronometer with the cover glass partly broken away.
Figure 5:
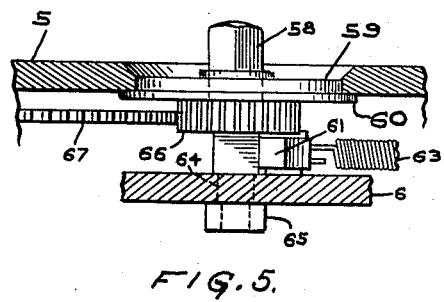
Figure 5 is a partial enlarged vertical sectional view on line 5—5 of Figure 3, of the break-circuit period selector mechanism.

Figures 3, 4 and 5 illustrate the manner in which the cam shaft 52 may be turned to secure the desired break period. The square shaft 58 projects through the dial of the clock and has a disk 59 bearing indicia indicating the position of cam shaft 52, whether 1-second, 2-second, 1 minute or "silent." This disk has a flange 60 engaging the under-surface of the dial 5. The shaft 58 engages at its sides a lock arm 61 pivoted at 62 and urged against the shaft by a spring 63. Thus the shaft will tend to remain in positions ninety degrees apart. A reduced neck 64 of shaft 58 fits into a bearing in top plate 6 and is held therein by collar 65. A gear 66 mounted on the shaft 58 turns cam shaft 52 through gears 67, 68, 69, 70 and 71. A lock spring 72 holds a square extension 73 of the cam shaft 52 in one of the ninety degree positions for the cam shaft, and insures the proper positioning of the cam shaft in spite of any slight backlash in the gears.

Figure 12:
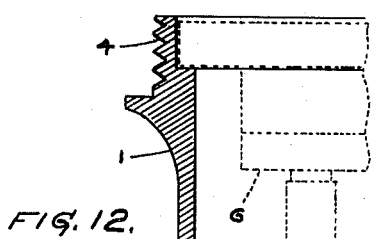
Figure 12 is a partial vertical view showing the insulated electrical connection to a terminal on the chronometer case.
Figure 11:
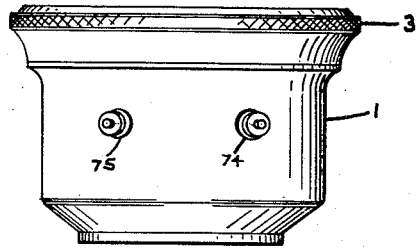
Figure 11 is an elevational view of the chronometer.

Figure 11 shows the terminals 74 and 75 on the casing 1 of the chronometer. Terminal 74 is grounded to the case and is thus electrically connected with bar 33 and spring arms 31. Terminal 75 is insulated from the casing as shown in Figure 12 by washers 76. Within the casing this terminal connects with a contact piece 77 having a ledge 78. The block 44 has a contact spring 79 attached thereto by screws 80 and when the chronometer works are inserted in the casing the spring 79 rests on ledge 78 to complete the circuit from terminal 75 to the comb 40.

The chronometer may be adjusted by means of a key turning square shaft 58, to open the circuit between terminals 74 and 75 periodically at any one of several intervals and a time base of a variety of periods is afforded with which astronomical or other observations may be coordinated.

It will be apparent that many modifications and changes of the chronometer above described may be made without departing from the invention of the following claims.

What is claimed as new and is desired to be secured by Letters Patent is:

1. A multiple break-circuit chronometer comprising a timing shaft rotating at a uniform rate, a plurality of pointed responsive members mounted adjacent said shaft, separate electrical conducting means mounting each of said members and having circuit connections at each end, all said conducting means being joined in parallel in a single circuit, a plurality of differently circumferentially spaced groups of pointed projections rotated by said timing shaft for deflecting each of said responsive members on the rotation of said timing shaft, means to move the separate members lengthwise of a tangent to the path of said rotated groups where they deflect, to adjust the point of contact of the said members and the respective projections of the several groups, an electric circuit through said conducting means opened by the deflection of said responsive members, and means for selectively placing any one of said responsive members into operative relation with its respective group of said deflecting projections, the spacing of the projections providing intervals of circuit closing and the projections providing instantaneous breaks, the electrical conducting means being insulated from the projections.

2. A multiple break-circuit chronometer comprising a timing shaft rotating at a uniform rate, a plurality of pointed responsive members mounted adjacent said shaft, separate electrical conducting means mounting each of said members and having circuit connections at each end, all said conducting means being joined in parallel in a single circuit, a plurality of groups of circumferentially spaced pointed projections rotated by said timing shaft, one group for deflecting each of said responsive members on the rotation of said timing shaft, an electric circuit through said conducting means opened by the deflection of said responsive members, and means for selectively placing any one of said responsive members into operative relation to its said rotated group of projections, the deflecting projections in each group for each responsive member being different in periods of deflection from others and differently disposed in relation to said shaft whereby different break cycles are produced in the electric circuit, the spacing of the projections providing intervals of circuit closing and the projections providing instantaneous breaks, the electrical conducting means being insulated from the projections.

3. A multiple break-circuit chronometer comprising a timing shaft rotating at a uniform rate, a plurality of electrical conducting spring arms mounted adjacent said shaft having circuit connections at each end, all said arms being joined in parallel in a single circuit, a spring deflecting pointed projection on each arm, wheels rotated by said timing shaft, pointed teeth on said wheels, said teeth being insulated from said arms, the teeth on each wheel being spaced differently from those on the other wheels, the teeth contacting said pointed projections for deflecting each of said spring arms on the rotation of said timing shaft, means to move the pointed projections in the direction of the length of the arms to adjust the point of contact of the projections and teeth, an electric circuit through said arms opened by the deflection of said spring arms and a plurality of cams on a common shaft adjacent said arms for selectively placing any one of said spring arms into operative relation to its said deflecting teeth.

4. A multiple break-circuit chronometer comprising a timing shaft rotating at a uniform rate, a plurality of electrical conducting spring arms mounted adjacent said shaft having circuit connections at each end, all said arms being joined in parallel in a single circuit, a spring deflecting pointed projection on each arm, wheels rotated by said timing shaft, pointed teeth on said wheels, the teeth on each wheel being spaced differently from those on the other wheels, the teeth contacting said pointed projections for deflecting each of said spring arms on the rotation of said timing shaft, means to move the pointed projections in the direction of the length of the arms to adjust the point of contact of the projections and teeth, an electric circuit through said arms opened by the deflection of said spring arms and means for selectively placing any one of said spring arms into operative relation to its said deflecting teeth, said selective placing means comprising cams engaging said spring arms to remove the spring arms from the path of said teeth, the spacing of said teeth providing intervals of circuit closing and the teeth providing instantaneous breaks, said arms being insulated from said teeth.

5. A multiple break-circuit chronometer comprising a timing shaft rotating at a uniform rate, a plurality of electrical conducting spring arms mounted adjacent said shaft having circuit connections at each end, all said arms being joined in parallel in a single circuit, and each having thereon a pointed projection, wheels rotated by said timing shaft, pointed teeth on said wheels for deflecting each of said spring arms by contacting the pointed projections on the rotation of said timing shaft, an electric circuit through said arms opened by the deflection of said spring arms and means for selectively placing any one of said spring arms into operative relation to its said deflecting teeth, said selective placing means comprising a multiple layer cam, separate layers engaging said spring arms to remove the spring arms from the path of said teeth, said cam layers having flattened portions angularly set off from those on other layers, a spring arm adjacent a flattened portion moving into operative relation to its teeth, the spacing of said teeth providing intervals of circuit closing and the teeth providing instantaneous breaks, said arms being insulated from said teeth.

6. A multiple break-circuit chronometer comprising a uniformly rotating timing shaft, a wheel mounted on said shaft and having spaced pointed teeth thereon, a pointed tooth spaced from the teeth of said wheel and connected thereto, a pair of electrical conducting spring arms having circuit connections at each end, all said arms being joined in parallel in a single circuit and mounted at one end to extend adjacent said gear and said tooth and each having a pointed projection for engagement with the respective gear and tooth adjacent the free ends thereof, circuit contact members contacting said spring arms in tooth engaging position, and cams at the ends of said spring arms having surfaces for selectively holding one spring arm out of engagement with its respective gear and tooth and also out of contact with the corresponding contact member, an electric circuit through said arms opened by said contacts, the spacing of said teeth providing intervals of circuit closing and the teeth providing instantaneous breaks, said arms being insulated from said teeth.

References Cited in the file of this patent

UNITED STATES PATENTS

| Number | Name | Date |
|---|---|---|
| 1,515,366 | Rosner | Nov. 11, 1924 |
| 1,783,375 | Butler | Dec. 2, 1930 |
| 2,005,085 | Hungerbuhler | June 18, 1935 |
| 2,633,914 | Miller | Apr. 7, 1953 |

FOREIGN PATENTS

| Number | Country | Date |
|---|---|---|
| 9,769 | Great Britain | Apr. 25, 1913 |